United States Patent [19]

Takaku et al.

[11] Patent Number: 5,180,529
[45] Date of Patent: Jan. 19, 1993

[54] PROCESS FOR PRODUCING A THIN CARBON PLATE

[75] Inventors: Akira Takaku; Toshimasa Hashimoto, both of Tokyo; Toshio Suzuki; Yutaka Takahashi, both of Saitama; Kazuo Saito, Tokyo, all of Japan

[73] Assignee: Nisshinbo Industries, Inc., Tokyo, Japan

[21] Appl. No.: 659,214

[22] Filed: Feb. 20, 1991

[30] Foreign Application Priority Data

Feb. 21, 1990 [JP] Japan .................................. 2-40587

[51] Int. Cl.$^5$ .............................................. C01B 31/02
[52] U.S. Cl. .................................... 264/29.6; 264/83; 423/449.6
[58] Field of Search .................... 264/29.1, 29.6, 29.7, 264/83; 423/445, 449

[56] References Cited

FOREIGN PATENT DOCUMENTS 63-161010 7/1988 Japan .

*Primary Examiner*—Leo B. Tentoni
*Attorney, Agent, or Firm*—Armstrong & Kubovcik

[57] ABSTRACT

The present invention relates to a thin carbon plate and a process for producing the same. More particularly, the present invention relates to a thin carbon plate excellent in properties such as gas impermeability, mechanical strengths and the like, as well as to a process for producing the same.

11 Claims, No Drawings

PROCESS FOR PRODUCING A THIN CARBON PLATE

BACKGROUND OF THE INVENTION

(1) Field of the Invention

The present invention relates to a thin carbon plate and a process for producing the same. More particularly, the present invention relates to a thin carbon plate excellent in properties such as gas impermeability, mechanical strengths and the like, as well as to a process for producing the same.

(2) Prior Art

Carbon materials have properties not possessed by other materials, such as excellent heat resistance, chemical stability, light-weight and the like. Therefore, they have been used as a special electrode agent, various jigs, a sealing agent, a separator for a fuel cell, etc. and moreover are finding wider usages.

Various additional requirements for higher performances have recently become necessary for carbon materials having excellent properties as mentioned above. That is, there has become necessary a thin carbon plate excellent in gas impermeability, mechanical strengths, etc.

Conventional thin carbon plates have been obtained by impregnating a high-density graphite with a phenolic resin, or binding a carbon powder with a resin, or carbonizing a phenolic or furan resin, or adding a graphite powder or a carbon fiber to a phenolic or furan resin and carbonizing the resulting mixture. These conventional thin carbon plates, however, have low mechanical strengths or low gas impermeability when made into a thin plate.

SUMMARY OF THE INVENTION

The present invention has been made in order to solve the above-mentioned problems of the prior art and provide a thin carbon plate having sufficient mechanical strengths and gas impermeability and a process for producing the same.

That is, in order to solve the above problems of the prior art, the present inventors made study with particular attention paid to a polycarbodiimide resin which can be easily molded into a thin plate and which can give a carbonization product of high carbon content at a high yield and, as a result, completed the present invention.

According to the present invention, there is provided a process for producing a thin carbon plate, which comprises molding a polycarbodiimide resin into a thin plate, subjecting the thin plate to a heat treatment, and carbonizing the heat-treated thin plate.

The present invention also provides a thin carbon plate obtained by molding a polycarbodiimide resin into a thin plate, subjecting the thin plate to a heat treatment, and carbonizing the heat-treated thin plate.

DETAILED DESCRIPTION OF THE INVENTION

The present invention is hereinafter described in detail.

The polycarbodiimide resin used in the present invention can be a known polycarbodiimide resin or a polycarbodiimide resin which can be produced in the same manner as for known polycarbodiimide resin [reference is made to U.S. Pat. No. 2,941,966; Japanese Patent Publication No.33297/1972; J. Org. Chem., 28. 2069.2075 (1963); Chemical Review, 1981, Vol. 81, No. 4, 619–621; etc.]. It can be easily produced by subjecting an organic diisocyanate to a condensation reaction wherein the elimination of carbon dioxide takes place.

The organic diisocyanate used in the production of a polycarbodiimide resin can be any of aliphatic type, alicyclic type, aromatic type, aromatic-aliphatic type, etc. They can be used alone or in combination of two or more (the latter case gives a copolymer).

The polycarbodiimide resin used in the process of the present invention includes a homopolymer or a copolymer both having at least one repeating unit represented by the formula

wherein R represents an organic diisocyanate residue.

As the R (organic diisocyanate residue) in the formula (I), there are particularly preferred an aromatic diiso. cyanate residue [In the present specification, the "organic diisocyanate residue" refers to a portion remaining after subtracting two isocyanate (NCO) groups from an organic diisocyanate molecule.].

The polycarbodiimidization catalyst has no particular restriction and can be illustrated by conventionally used phosphorene oxides such as 1-phenyl-2-phosphorene-1-oxide, 3-methyl-2-phosphorene-1-oxide, 1-ethlyl-3-methyl-2-phosphorene-1-oxide, 1-ethyl-2-phosphorene-1-oxide and 3-phosphorene isomers thereof or the like.

Specific examples of the polycarbodiimide resin include the following.

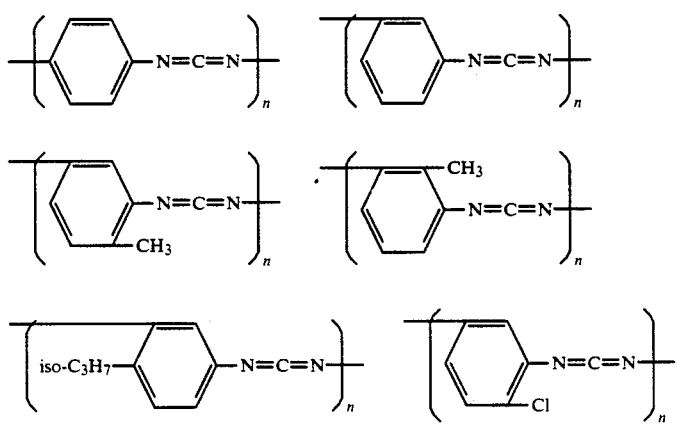

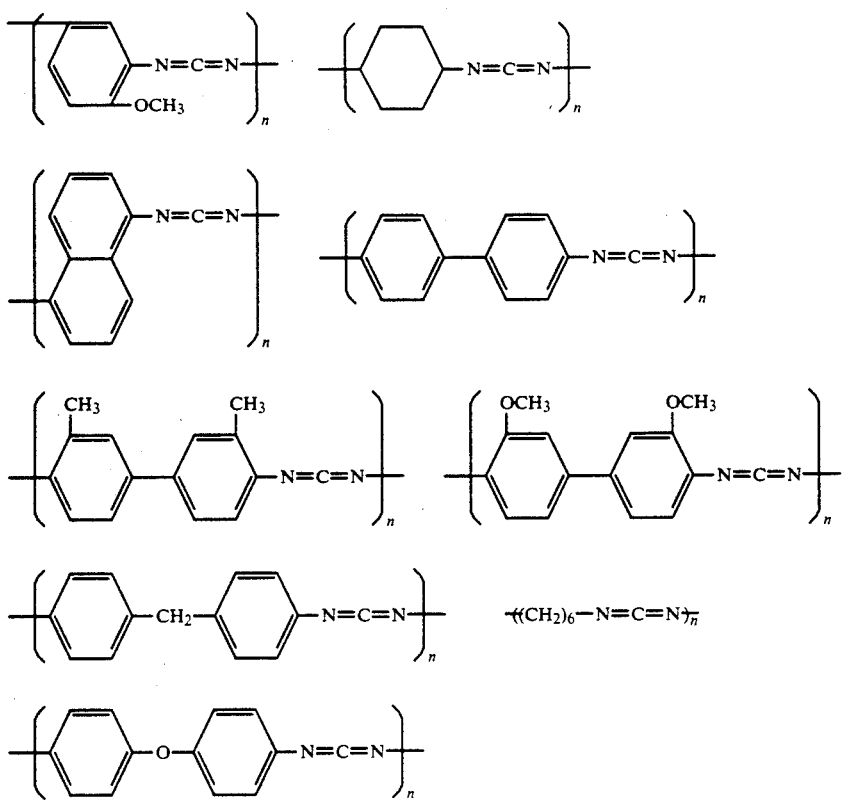

In the above formulas, n is a degree of polymerization and is in the range of 10–10,000, preferably in the range of 50–5,000.

Incidentally, the terminal(s) of the polycarbodiimide resin may be blocked with a monoisocyanate or the like, and the polycarbodiimide resin described above can be obtained in a solution form, or as a powder precipitated from the solution.

The thus obtained polycarbodiimide resin is molded into a thin plate. The molding into a thin plate is effected, for example, as follows. The reaction mixture itself after synthesis of polycarbodiimide resin, or a polycarbodiimide resin solution obtained by isolating a polycarbodiimide resin powder from said reaction mixture and dissolving the powder in a solvent, is cast on, for example, a flat smooth glass plate, and then the solvent in the reaction mixture or the solution is removed. As the solvent, there can be used tetrachloroethylene, trichloroethylene, tetrahydrofuran, dioxane, monochlorobenzene, dichlorobenzene, dimethylformamide, N-methyl-2-pyrrolidone, dimethylacetamide, dimethylsulfoxide, etc.

It is possible that a polycarbodiimide resin powder be subjected to compression molding, roll molding, injection molding, transfer molding or the like to obtain a thin plate.

By these molding methods, a thin plate having a thickness of about 0.1–3 mm can be obtained easily.

The thin plate is then subjected to a heat treatment. This heat treatment is effected at temperatures of 150°–400° C., preferably 200–350° C. for 30 minutes to 50 hours. The heat treatment increases moldability and yield in a subsequent carbonization step and also improves dynamic properties after carbonization.

The above heat treatment can be effected in an oxidizing atmosphere such as air or the like.

Lastly, the heat-treated thin plate is carbonized. Carbonization is effected by elevating the temperature of the thin plate from around room temperature −200° C. to 600°–3,000° C. in vacuum or a non-oxidizing atmosphere of inert gas. The temperature elevation is preferably effected slowly at a rate of preferably 30° C./min or less. The temperature elevation to 600° C. or more gives a final thin plate having substantially desired properties.

When the final carbonization temperature is less than 600° C., the resulting thin plate has low electrical conductance and, when the temperature is more than 3,000° C., the thin plate has a low yield.

In the above carbonization, as soon as the temperature elevation has reached the final temperature, the thin plate has substantially desired properties; accordingly, it is not necessary to continue carbonization at the final temperature.

It is of course possible to effect the heat treatment step and the carbonization step continuously by subjecting a polycarbodiimide resin thin plate to a heat treatment at the above-mentioned temperatures for the above-mentioned period and successively carbonizing the heat-treated thin plate under the above-mentioned conditions.

The present invention is hereinafter described in more detail by way of Examples.

EXAMPLE 1

54 g of a 80:20 mixture of 2,4-tolylenediisocyanate and 2,6-tolylenediisocyanate [TDI] was reacted in the presence of 0.12 g of a carbodiimidization catalyst (1-phenyl-3-methylphosphorene oxide) in 500 ml of tetrachloroethylene at 120° C. for 4 hours to obtain a polycarbodiimide solution. From the solution was prepared a polycarbodiimide thin plate of 200 μm in thickness by a dry method.

The thin plate was subjected to a heat treatment by elevating the temperature from 150° C. to 300° C. at a rate of 1° C./min.

The heat treated thin plate was carbonized by elevating the temperature in an inert gas current from room temperature to 1,000° C. at a rate of 10° C./min. Immediately, the carbonized thin plate was allowed to cool to room temperature to obtain a thin carbon plate of 180 μm in thickness.

The properties of the thin carbon plate obtained are shown in the Table given later.

EXAMPLE 2

50 g of methylenediphenyl diisocyanate [MDI] was reacted in the presence of 0.13 g of a carbodiimidization catalyst (1-phenyl-3-methylphosphorene oxide) in 880 ml of tetrahydrofuran at 68° C. for 12 hours to obtain a polycarbodiimide solution. The solution was developed on a glass plate and a dry method was applied to obtain a polycarbodiimide thin plate of 200 μm in thickness.

The thin plate was subjected to a heat treatment by elevating the temperature from 150° C. to 250° C. at a rate of 1° C./min and keeping the plate at 250° C. for 3 hours.

The heat-treated thin plate was heated from room temperature to 1,000° C. at a rate of 10° C./min in an inert gas current and then immediately allowed to cool to obtain a thin carbon plate of 180 μm in thickness.

The properties of the thin carbon plate obtained are shown in the Table given later.

EXAMPLE 3

The polycarbodiimide thin plate obtained in Example 1 was heated from 150° C. to 350° C. at a rate of 2° C./min and then carbonized in the same manner as in Example 1 to obtain a thin carbon plate.

The properties of the thin carbon plate obtained are shown in the Table given later.

EXAMPLE 4

50 g of paraphenylene diisocyanate was reacted in the presence of 0.13 g of a carbodiimidization catalyst (1-phenyl-3-methylphosphorene oxide) in 880 ml of tetrahydrofuran at 68° C. for 5 hours. The resulting solution was cooled to room temperature, whereby a polycarbodiimide was precipitated. The precipitate was collected by filtration and dried at 100° C. for 2 hours to obtain a polycarbodiimide powder. The powder was subjected to press molding at a press temperature of 180° C. at a press pressure of 80 kg/cm² to prepare a polycarbodiimide thin plate of 500 μm in thickness.

The thin plate was subjected to a stepwise heat treatment by heating it at 150° C. for 2 hours, at 200° C. for 5 hours, at 250° C. for 2 hours and at 350° C. for 30 minutes.

The heat-treated thin plate was heated from room temperature to 1,000° C. at a rate of 5° C./min in nitrogen, and immediately allowed to cool to obtain a thin carbon plate of 420 μm in thickness.

The properties of the thin carbon plate obtained are shown in the Table given later.

EXAMPLE 5

150 g of MDI was reacted in the presence of 0.13 g of a carbodiimidization catalyst (1.phenyl.3.methylphosphorene oxide) in 820 ml of tetrachloroethylene at 120° C. for 6 hours, and the same manner as in Example 4 was applied to obtain a polycarbodiimide powder. This powder was subjected to press molding at a press temperature of 160° C. at a press pressure of 80 kg/cm² to prepare a polycarbodiimide thin plate of 500 μm in thickness. This thin plate was subjected to a heat treatment in the same manner as in Example 1.

The heat-treated thin plate was heated from room temperature to 1,000° C. at a rate of 5° C./min in nitrogen to obtain a thin carbon plate of 420 μm in thickness.

The properties of the thin carbon plate obtained are shown in the Table given later.

EXAMPLE 6

The polycarbodiimide thin plate prepared in Example 1 was subjected to a heat treatment by elevating the temperature from 150° C. to 300° C. at a rate of 2° C./min.

The heat-treated thin plate was carbonized by elevating the temperature from room temperature to 2,000° C. at a rate of 10° C./min in an inert gas current, and then immediately allowed to cool to room temperature to obtain a thin carbon plate of 175 μm in thickness.

The properties of the thin carbon plate obtained are shown in the Table given later.

COMPARATIVE EXAMPLE 1

The properties of GC COMPOSITE (separator for a fuel cell, a commercial product of Kobe Steel, Ltd.) of 1 mm in thickness are shown in the Table given later.

COMPARATIVE EXAMPLE 2

The polycarbodiimide thin plate prepared in Example 1 was heated from 150° C. to 430° C. at a rate of 2° C./min. In this heat treatment, the thin plate caused pyrolysis and had no handleability, making subsequent carbonization impossible.

COMPARATIVE EXAMPLE 3

The polycarbodiimide thin plate of 500 μm in thickness, prepared in Example 5 was carbonized by elevating the temperature from room temperature to 1,000° C. at a rate of 5° C./min in nitrogen, without subjecting the thin plate to a heat treatment, whereby a thin carbon plate of 420 μm was obtained.

The properties of the thin carbon plate obtained are shown in the Table given later.

TABLE

| | Bulk density g/cm³ | Gas impermeability cc/min · cm³ | Specific resistance mΩ · cm | Tensile strength kg/mm² |
| --- | --- | --- | --- | --- |
| Example 1 | 1.71 | $9.2 \times 10^{-7}$ | 3.0 | 28 |
| Example 2 | 1.71 | $1.0 \times 10^{-6}$ | 2.9 | 27 |
| Example 3 | 1.71 | $2.0 \times 10^{-7}$ | 3.0 | 28 |
| Example 4 | 1.71 | $9.0 \times 10^{-7}$ | 2.9 | 27 |
| Example 5 | 1.71 | $5.0 \times 10^{-7}$ | 3.2 | 25 |
| Example 6 | 1.71 | $9.5 \times 10^{-7}$ | 3.1 | 26 |
| Comparative Example 1 | 1.71 | $2.0 \times 10^{-5}$ | 3.3 | 4.25 |
| Comparative Example 2 | | ← Unable to measure → | | |
| Comparative Example 3 | 1.70 | $1.2 \times 10^{-6}$ | | 19 |

What is claimed is:

1. A process for producing a thin carbon plate, which comprises molding a polycarbodiimide resin into a thin plate, subjecting the thin plate to a heat treatment, and carbonizing the heat-treated thin plate.

2. A process according to claim 1, wherein the polycarbodiimide resin is a homopolymer or copolymer comprising at least one recurring unit represented by the formula $$-R-N=C=N-$$

wherein R is an organic diisocyanate residue.

3. A process according to claim 1 or 2, wherein the heat treatment is effected at temperatures of 150–400° C. for 30 minutes to 50 hours.

4. A process according to claim 1 or 2 wherein the heat treatment is effected in an oxidizing atmosphere.

5. A process according to claim 1 or 2 wherein the carbonization is effected at temperatures of 600–3,000° C.

6. A process according to claim 1 or 2 wherein the carbonization is effected by increasing the temperature at a rate of 30° C./min or less.

7. A process according to claim 1 or 2 wherein the heat treatment step and the carbonization step are effected successively.

8. A process according to claim 4, wherein the heat treatment is effected in an oxidizing atmosphere of air.

9. A process according to claim 4, wherein the heat treatment is effected at temperatures of 200° C. to 350° C.

10. A process for producing a thin carbon plate, which comprises molding a polycarbodiimide resin into a thin plate, subjecting the thin plate to a heat treatment in an oxidizing atmosphere at temperatures of 150° C. to 400° C., and carbonizing the heat-treated plate at temperatures from 600 to 3,000° C.

11. A process according to claim 10, wherein the heat treatment is effected at temperatures of 200° C. to 350° C.

* * * * *